W. H. PALMER.
PNEUMATIC TOOL.
APPLICATION FILED OCT. 1, 1919.
1,362,503.
Patented Dec. 14, 1920.
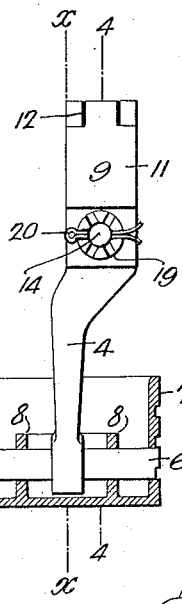
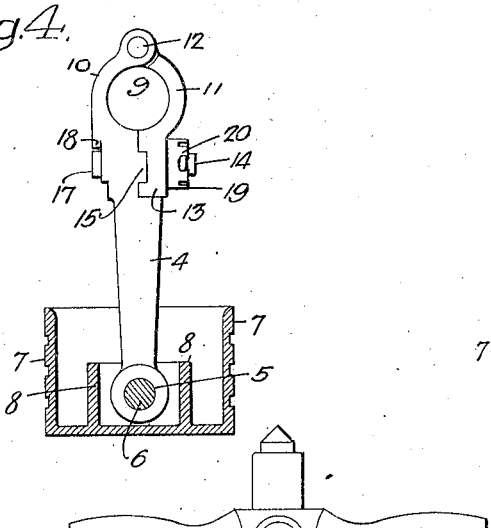
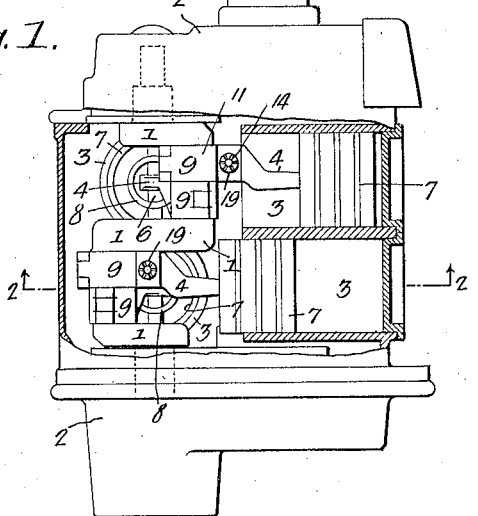
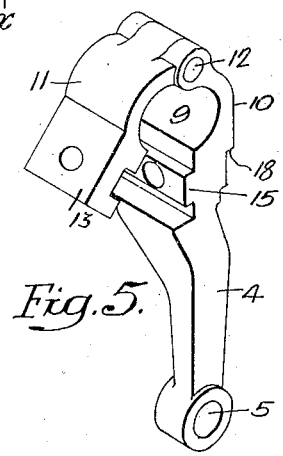
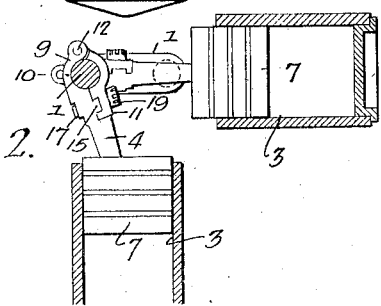
Inventor—
William H. Palmer
by his Attorneys
Howson & Howson

UNITED STATES PATENT OFFICE.

WILLIAM H. PALMER, OF MONTREAL, CANADA.

PNEUMATIC TOOL.

1,362,503.   Specification of Letters Patent.   Patented Dec. 14, 1920.

Application filed October 1, 1919. Serial No. 327,664.

*To all whom it may concern:*

Be it known that I, WILLIAM H. PALMER, a subject of the King of Great Britain and Ireland and the Isle of Man, and a resident of Montreal, Canada, have invented certain Improvements in Pneumatic Tools, of which the following is a specification.

My invention relates to certain improvements in pneumatic drills in which there is a series of cylinders having pistons connected to a crank shaft.

One object of the invention is to improve the construction of the toggle or piston rod.

A further object of the invention is to reduce the number of parts of a rod in this type of apparatus.

A still further object of the invention is to provide a substantial bearing at the crank for each rod.

In the accompanying drawings:

Figure 1 is a sectional plan view of one type of pneumatic drill, illustrating my invention;

Fig. 2 is a transverse sectional view on the line 2—2, Fig. 1, the casing being omitted;

Fig. 3 is a detached side view of one of the pistons and its rod;

Fig. 4 is a sectional view on the line 4—4, Fig. 3, and

Fig. 5 is a detached perspective view showing the box open.

1 is the crank of a pneumatic drill mounted in suitable bearings in the casing 2. 3 are the four cylinders, one set of cylinders being at right angles to the other set, as clearly shown in Fig. 2. 4 is a piston rod, or toggle, for each cylinder. The rod has an opening 5 at one end through which passes a wrist pin 6 screwed into the wall of a piston 7, which is made hollow, as shown in Figs. 3 and 4. The piston has a deep flange 8 surrounding the bearing portion, which also acts as a support for the wrist pin. At the opposite end of the rod 4 is a bearing 9, which fits over the crank of the crank shaft 1.

It will be noticed that the bearing is offset from the line $x$—$x$ through the center of the crank, Fig. 3, and the offset is of such an extent that when two cranks having a pair of angularly disposed cylinders are arranged on the crank shaft, the center line of each piston will be the dividing line between the boxes. Each box is made in two sections, the section 10 forming an integral part of the rod 4, while the section 11 is pivoted at 12 to the section 10 and has an extension 13 in which is an opening for the passage of a bolt 14, which extends through a similar opening in the fixed portion of the box. In order to lock the two sections of the box rigidly together, I form an enlargement 15 on one part adapted to a recess in the other part. The head 17 of the bolt 14 has a flat surface fitting a shoulder 18 on the fixed portion 10 so as to prevent the bolt from turning, and the nut 19, in the present instance, is a castellated nut and is held from turning on the bolt by a cotter pin 20. The piston 7 is free to move laterally on the rod 4, but is otherwise held rigidly to the rod.

By the above construction, a very substantial rod is made and one which will withstand the heavy duty placed upon it.

It will be understood that in pneumatic drills, the pistons reciprocate at a high speed and there is a certain amount of jarring action which must be overcome. The enlargement 15 and the coacting recess also constitute a substantially broad shoulder-formation which will take care of and resist the longitudinal thrust placed on the rod and thereby relieve the pivot pin 12 of any shearing strain to which it would otherwise be subjected. By making the rods offset, as shown, I am enabled to provide a wide bearing 9, and the bolts and pins can be very substantially made. By coupling the rod to the piston by a wrist pin, as shown, a simple and substantial coupling is obtained.

I claim:

1. A connecting rod comprising two arms of unequal length hinged together at one end, the longer arm being laterally offset for a portion of its length, one of said arms having a recess in its inner face and the other arm having a projection on its inner face fitting said recess whereby the longitudinal thrust of the rod is resisted, and means for securing said arms to each other.

2. A connecting rod comprising two sections hinged together at one end and having inner faces recessed to jointly form a bearing, one of said arms being of greater length than the other and being laterally offset for a portion of its length, said arms having a co-acting lug and recess formation on their opposite inner faces, adapted to resist longitudinal thrust of the rod.

3. A connecting rod comprising two arms of unequal length having inner faces provided with a bearing, one of said arms having a recess in its inner face and the other arm having a projection to fit said recess to bring the arms into alinement and to resist longitudinal thrust of the rod, a headed bolt for locking the two arms rigidly together, means for preventing the head of the bolt from turning, and a nut on said bolt.

WILLIAM H. PALMER.